United States Patent [19]

Wahi

[11] 4,065,201

[45] Dec. 27, 1977

[54] CONNECTOR

[75] Inventor: Chander M. Wahi, Waseca, Minn.

[73] Assignee: E. F. Johnson Company, Waseca, Minn.

[21] Appl. No.: 743,420

[22] Filed: Nov. 19, 1976

[51] Int. Cl.² ............................................. H01R 13/58
[52] U.S. Cl. ............................... 339/103 R; 174/135; 339/273 R
[58] Field of Search ........... 339/103 R, 103 B, 103 C, 339/89 M, 94 C, 106, 196 M, 273 R; 174/65 R, 65 SS, 135

[56] References Cited

U.S. PATENT DOCUMENTS

| | | | |
|---|---|---|---|
| 2,331,409 | 10/1943 | Markey | 339/89 M |
| 3,056,852 | 10/1962 | Sachs | 339/103 B X |
| 3,430,187 | 2/1969 | De Man et al. | 339/103 R |
| 3,624,591 | 11/1971 | Buberniak | 339/103 R |
| 3,668,612 | 6/1972 | Nepovim | 339/94 C |
| 3,744,008 | 7/1973 | Castellani | 339/103 B X |
| 3,801,131 | 4/1974 | Appleton | 174/65 R X |
| 3,833,754 | 9/1974 | Philibert | 174/65 SS |

Primary Examiner—Gerald A. Dost
Assistant Examiner—DeWalden W. Jones
Attorney, Agent, or Firm—Warren A. Sturm; Hugh D. Jaeger

[57] ABSTRACT

A cable connector for securely connecting an electric cable to the housing of an electric device such as a motor. The connector includes a body and a nut, the body having a rearwardly extending, elongated neck with an internal bore through which may be passed a cable or the like. The neck is externally threaded along at least a portion of its length to receive the internally threaded nut, and the wall of the neck has at least one generally U-shaped slot therethrough to provide at least one forwardly-extending ear movable radially inwardly and outwardly of the neck. The radial thickness of the at least one ear increases forwardly, with the thickness of the ear at its forward end being greater than that of the adjacent neck walls, whereby, as the nut is threaded forwardly onto the neck, the ear is cammed inwardly of the bore to firmly grasp a cable.

7 Claims, 5 Drawing Figures

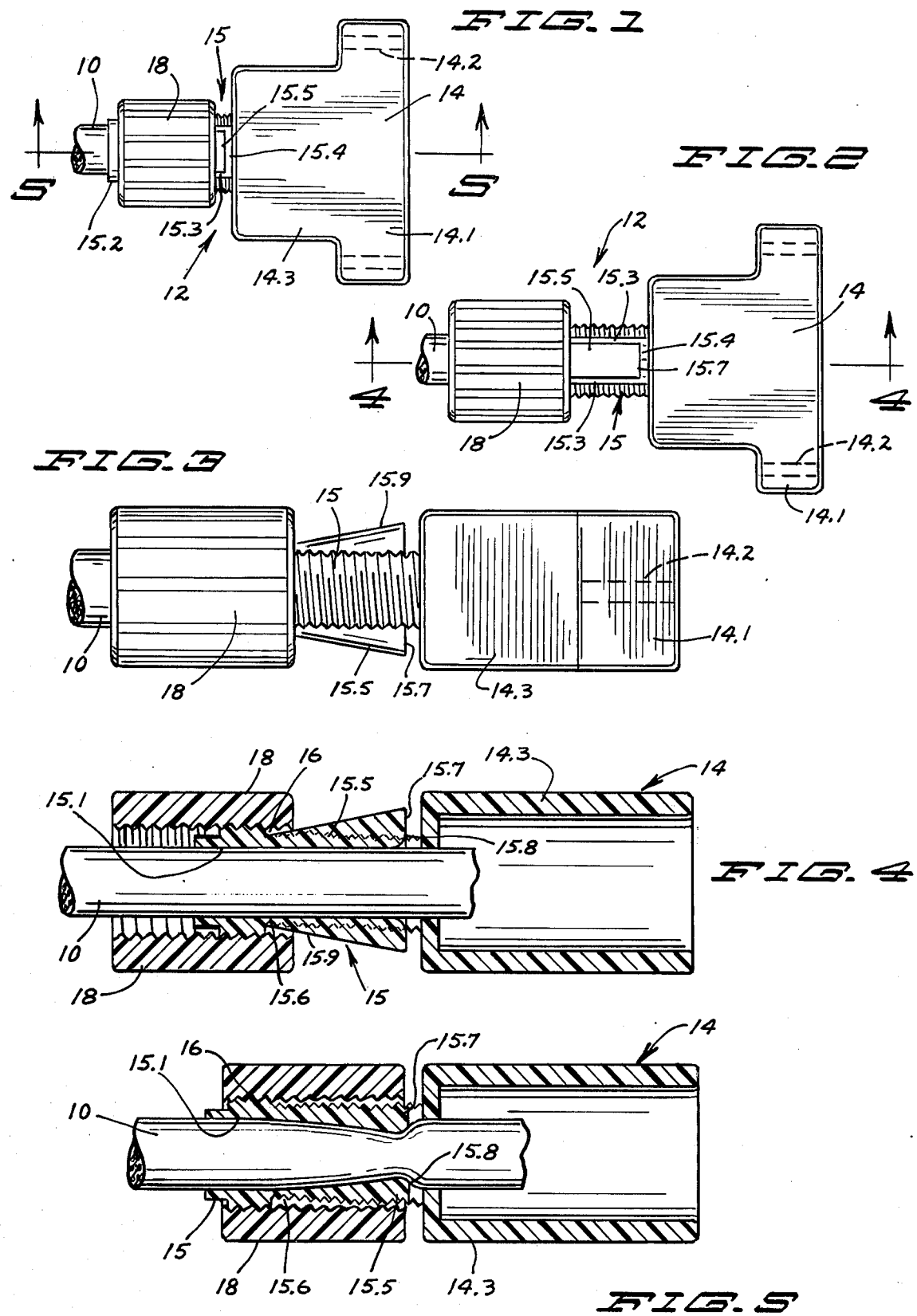

CONNECTOR

BACKGROUND OF THE INVENTION

When electric cables, such as power supply cables, are led through the housing of an electrical device such as a motor or a multi-lead electric connector, care must be taken to properly anchor the cable to the housing so as to prevent the cable or its insulating covering from accidentally being pulled loose. Such cables ordinarily comprise two or more lead wires, about which is carried a closely fitting, tubular insulating sheath, and accidental tugs or pulls on the cable may break the electrical connection, or may cause the insulating sheath to be stripped away from the wire.

Various cable connectors have been devised for the purpose of clamping an insulated cable to a housing of an electrical device so as to prevent the cable from being pulled loose from the device. Among these are the connectors shown in U.S. Pat. Nos. 3,668,612; 3,744,008; 2,331,409; 3,624,591 and 3,430,187. Such cable connectors ordinarily have three or four or more separate parts, and the parts must be carefully assembled during installation of a cable. As a reslt, many small, different parts must be inventoried, and considerable valuable time is spent in assembling the parts onto a cable ince oft times the parts must be strung onto the cable in a certain order for subsequent mutual assembly.

A simple, two-piece cable connector which requires only a single nut to be prestrung on the cable and which is capable of rigidly clamping the cable to the housing of an electric motor or the like is much to be desired.

SUMMARY OF THE INVENTION

The present invention provides a two-piece cable connector for securely connecting an electric cable to the housing of an electric device such as a motor. The connector comprises a body and a nut, the body being mountable to the housing of an electric device and having a rearwardly extending, elongated neck with an internal bore though which may be passed a cable. The neck is externally threaded along at least a portion of its length to receive the nut, which is threaded internally. The wall of the neck has at least one generally U-shaped slot therethrough to provide at least one forwardly extending ear movable radially inwardly and outwardly of the neck. The radial thickness of the at least one ear increases forwardly, with the thickness of the at least one ear at its forward end being greater than that of the adjacent neck walls. As the nut, which is prestrung on a cable, is threaded forwardly onto the neck, the at least one ear is cammed inwardly of the bore to firmly grasp and hold a cable. Desirably, the neck is provided with two diametrically opposed ears.

DESCRIPTION OF THE DRAWING

FIG. 1 is a side view of a cable connector of the invention, fully assembled upon a cable;

FIG. 2 is a side view similar to that of FIG. 1 but showing the connector in a partially assembled state;

FIG. 3 is a top view of the connector of FIG. 2;

FIG. 4 is a cross-sectional view taken along line 4—4 of FIG. 2 and showing the partially assembled connector; and FIG. 5 is a cross-sectional view taken along line 5—5 of FIG. 1, and showing the connector in a fully assembled state.

DETAILED DESCRIPTION OF THE PREFERRED EMBODIMENT

In the drawing, a cable to be connected to a housing of an electric motor or the like is designated generally as 10, and the cable connector of the invention designated generally as 12 in FIGS. 1 and 2, includes a body portion 14 and a nut 18. The body portion is of unitary, integral construction, and is shown as including a flange 14.1 which may have bolt holes 14.2 therethrough for bolting the body forwardly to the housing of an electrical device. Extending rearwardly from the flange is a generally cup-shaped hood 14.3 open forwardly toward the device to which the flange is to be attached. Extending rearwardly from the hood 14.3 is an elongated bore 15.1 through which may be passed a cable 10, the cable extending thence into the hood 14.3 and, generally, through a hole in the housing of the electric device for ultimate connection to the device. The neck 15 is threaded along at least a portion of its length, except as will be indicated below, and has a rearmost end 15.2 (FIG. 1) of slightly reduced other diameter.

Slots 15.3, 15.4 (FIGS. 1 and 2), which together form generally U-shaped slots, are formed through the wall of the neck 15, the slots 15.3 forming the legs of the U being generally parallel and running parallel to the neck axis, and the slot 15.4 forming the crossbar of the U joining the axial slots at the forward end of the neck. Those portions 15.5 of the neck wall within the U-shaped slots (hereafter "ears") extend forwardly adjacent the hood and merge rearwardly into the tubular neck at 15.6 in FIGS. 4 and 5. The outer diameter of the neck at the points 15.6 where the ears arise from the neck is reduced somewhat to lend flexibility to the ears and permit them to swing radially inwardly and outwardly of the neck. The reduced diameter at point 15.6 provides an annular relief space, designated 16. The radial thickness of the ears increases forwardly, and at their forward ends 15.7, the radial thickness of the ears is considerably greater (e.g., 30% greater) than is the radial thickness of the neck wall adjacent the forward ends of the ears. The inner, forward rim of the ears is rounded, as shown at 15.8 in FIGS. 4 and 5 so as to avoid cutting of the insulating cable sheath.

As shown in the drawing, two diametrically opposed ears 15.5 are provided so that a cable 10 may be squeezed between them. Although a pair of diametrically opposed ears is preferred, it will be understood that one or three or more ears could also be employed if desired. The outer surfaces 15.9 desirably are smooth; that is, the threads along the length of the neck are not continued onto the outer surface of the ears.

The nut 18 is internally threaded, and desirably is of sufficient length to overlie the entire length of the ears 15.5. The internal open ends of the nut may be beveled slightly to permit the nut to be easily threaded upon the neck 15, and to permit the nut to bear down upon and slide easily along the outer surfaces of the ears 15.5.

The connector is preferably made of a plastic material, and the body portion 14 is molded as an integral unit. The nut 18 may be of a similar material, molded with internal threads to threadingly engage the outer surface of the neck 15. The slots 15.3, 15.4 are dimensioned to provide ample clearance for the ears 15.5 to move inwardly and outwardly of the neck.

In use, the flange 14.1 of the body portion 14 is suitably bolted to the housing of an electric motor or the like with the bore 15.1 of the neck in line with an access port through housing. The end of a cable 10 is prepared for attachment of the wires thereof to the electric motor (e.g., insulation may be stripped back, etc.), and the nut 18 is strung onto the end of the cable. The cable is then advanced easily through the bore 15.1 in the connector body and through the housing of the electric device. The ears 15.5 at this point are in the positions shown in FIGS. 2, 3 and 4 with the desirably smooth, inner surfaces of the ears permitting the cable to slide smoothly through the bore. Thereafter, the nut is threaded fully onto the neck as shown in FIGS. 1 and 5. As the nut advances, the ears 15.5 are cammed inwardly as shown in FIG. 5, the inner surfaces of the ears gripping the cable without cutting it to prevent the cable from being pulled loose from the housing of the electric device. It will be noted that the threaded portion of the neck extends rearwardly slightly from the point from which the ears arise so that the nut can be well started on the neck before the ears are encountered.

Thus, manifestly, I have provided a cable connector of simple but unique construction, which has but two parts for easy assembly, and which firmly grasps a cable without biting into or tearing the cable insulation.

While I have described a preferred embodiment of the present invention, it should be understood that various changes, adaptations, and modifications may be made therein without departing from the spirit of the invention and the scope of the appended claims.

What is claimed is:

1. A cable connector for securely connecting an electric cable to the housing of an electric device and including an internally threaded nut and an integral body, the body having a rearwardly extending, elongated neck with an internal bore through which may be passed a cable, the neck being externally threaded along at least a portion of its length to receive the threaded nut and the walls of the neck having slots therethrough to provide at least one forwardly-extending ear movable radially inwardly and outwardly of the neck, the ear having a radial thickness at its forward end greater than the thickness of the adjacent walls of the neck, whereby, as the nut is threaded forwardly onto the neck, the at least one ear is cammed inwardly of the bore to firmly grasp a cable.

2. The connector of claim 1 wherein the slots through the neck define two ears which are diametrically opposed so as to squeeze between them a cable as the nut is threaded onto the neck.

3. The connector of claim 1 wherein the at least one ear has an inner surface terminating forwardly in a gently rounded edge to prevent the ear from cutting into a cable.

4. The connector of claim 1 wherein the at least one ear has a smooth outer surface for camming contact with the nut as the latter is threaded onto the neck.

5. The connector of claim 1 wherein the at least one ear has inner and outer circumferential surfaces which uniformly diverge forwardly with the outer surface presenting a gently sloped camming surface to the nut.

6. The connector of claim 1 in which the threaded portion of the neck extends rearwardly of the at least one ear, whereby the nut may be threadingly started on the neck before encountering the ear.

7. A cable connector for securely connecting an electric cable to the housing of an electric device, and including an internally threaded nut, and an integral, molded plastic body, the body having a rearwardly extending, elongated neck with an internal bore through which may be passed a cable, the neck having external threads along at least a portion of its length to receive the internally threaded nut, and the walls of the neck having generally U-shaped slots therethrough to provide forwardly extending, diametrically opposed ears movable radially inwardly and outwardly of the neck, the radial thickness of the ears increasing gradually forwardly with the thickness of the ears at their forward ends being greater than the that of the adjacent neck walls, the ears having smooth outer circumferential surfaces and inner surfaces terminating forwardly in gently rounded edges to prevent the ears from cutting into a cable, whereby, as the nut is threaded forwardly onto the neck, the ears are cammed mutually inwardly of the bore to firmly grasp between them a cable.

* * * * *